United States Patent [19]
Carr

[11] 3,976,310
[45] Aug. 24, 1976

[54] LANDING GEAR MOUNTING BRACKET

[75] Inventor: George W. Carr, Albuquerque, N. Mex.

[73] Assignee: Pullman Incorporated, Chicago, Ill.

[22] Filed: June 19, 1975

[21] Appl. No.: 588,541

[52] U.S. Cl. .............................................. 280/766
[51] Int. Cl.² ........................................... B60S 9/08
[58] Field of Search ................. 280/150.5, 475, 763, 280/766; 254/86 R, 86 H; 248/248, 247, 300, 301

[56] References Cited
UNITED STATES PATENTS

| | | | |
|---|---|---|---|
| 1,856,044 | 4/1932 | Stowell | 248/247 |
| 3,027,178 | 3/1962 | Eaves | 280/154.5 R |
| 3,503,588 | 3/1970 | Bach | 254/86 H |
| 3,807,756 | 4/1974 | Glassmeyer | 280/150.5 |
| 3,897,083 | 7/1975 | Pickering | 280/150.5 |

Primary Examiner—Robert R. Song
Attorney, Agent, or Firm—Richard J. Myers

[57] ABSTRACT

A strengthening rib and bead means in a vertical mounting bracket for securing the leg of a semi-trailer landing gear to the trailer underframe and adaptable to a variety of associated landing gear mechanisms. The bracket includes an integral flange horizontally extending from its upper end couplable with the trailer underframe and a vertical plate portion couplable with the gear leg. Strengthening ribs are integrally formed in a portion of the flange and extend diagonally to the plate and vertically extending reinforcement beads are integrally formed in the vertical plate on both sides of three enlarged apertures provided in the plate through which an associated landing gear mechanism may be selectively extended.

3 Claims, 11 Drawing Figures

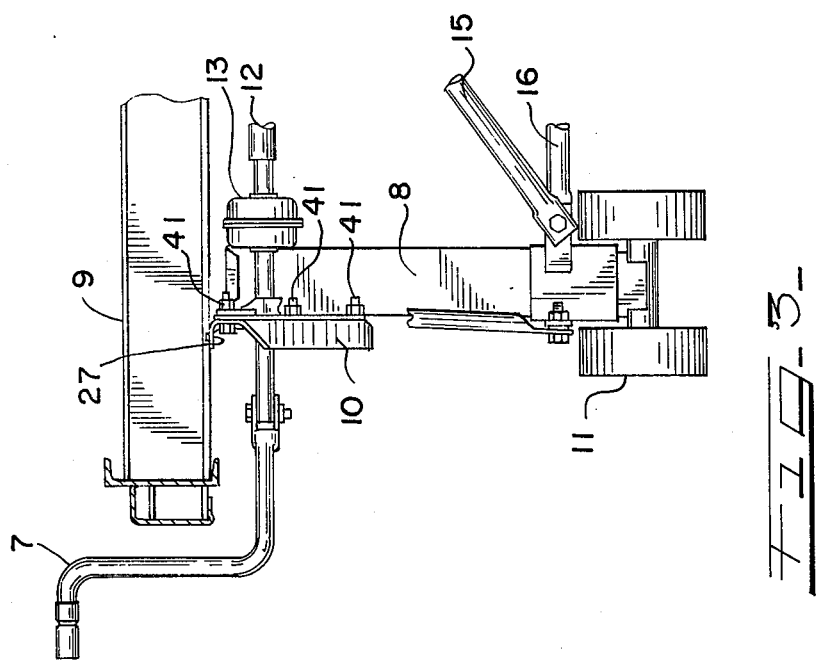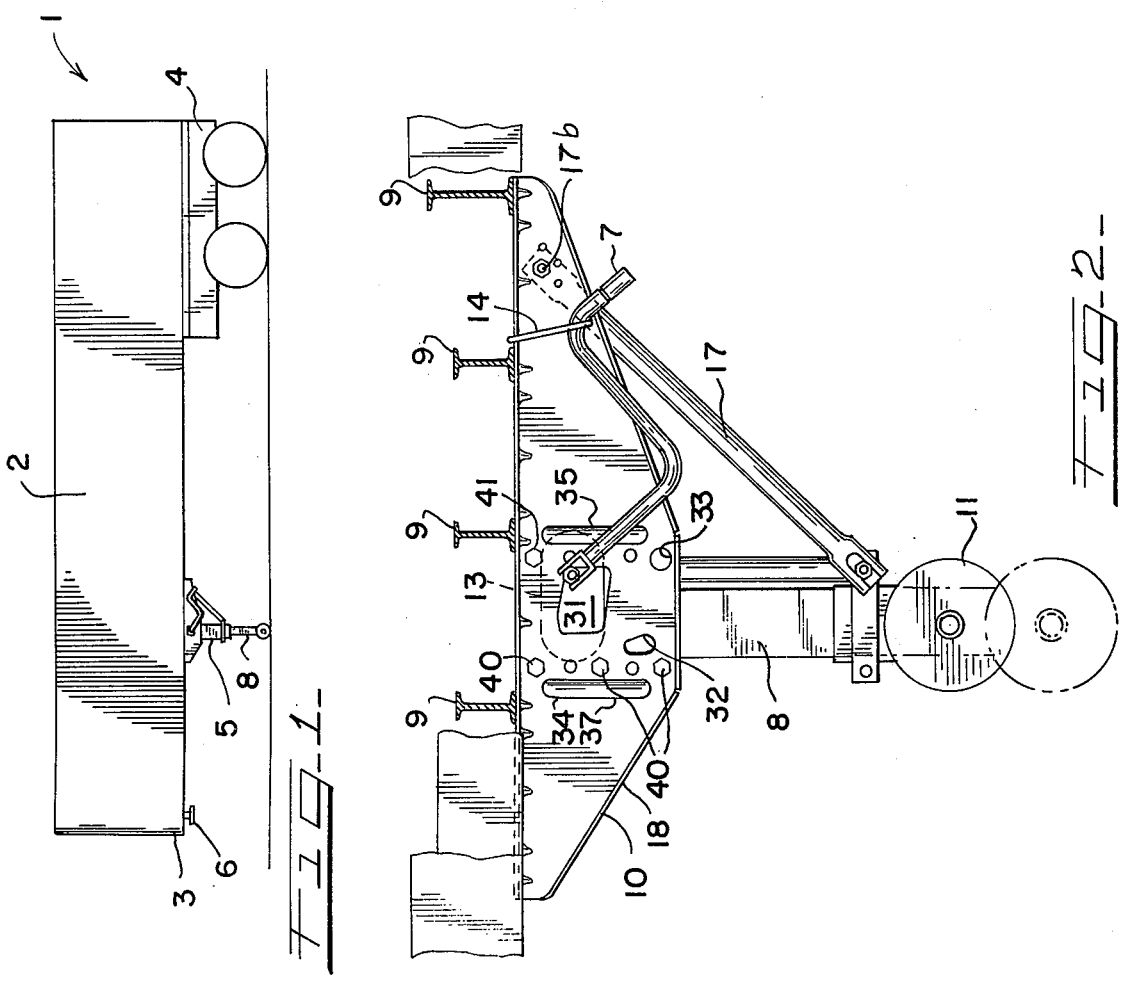

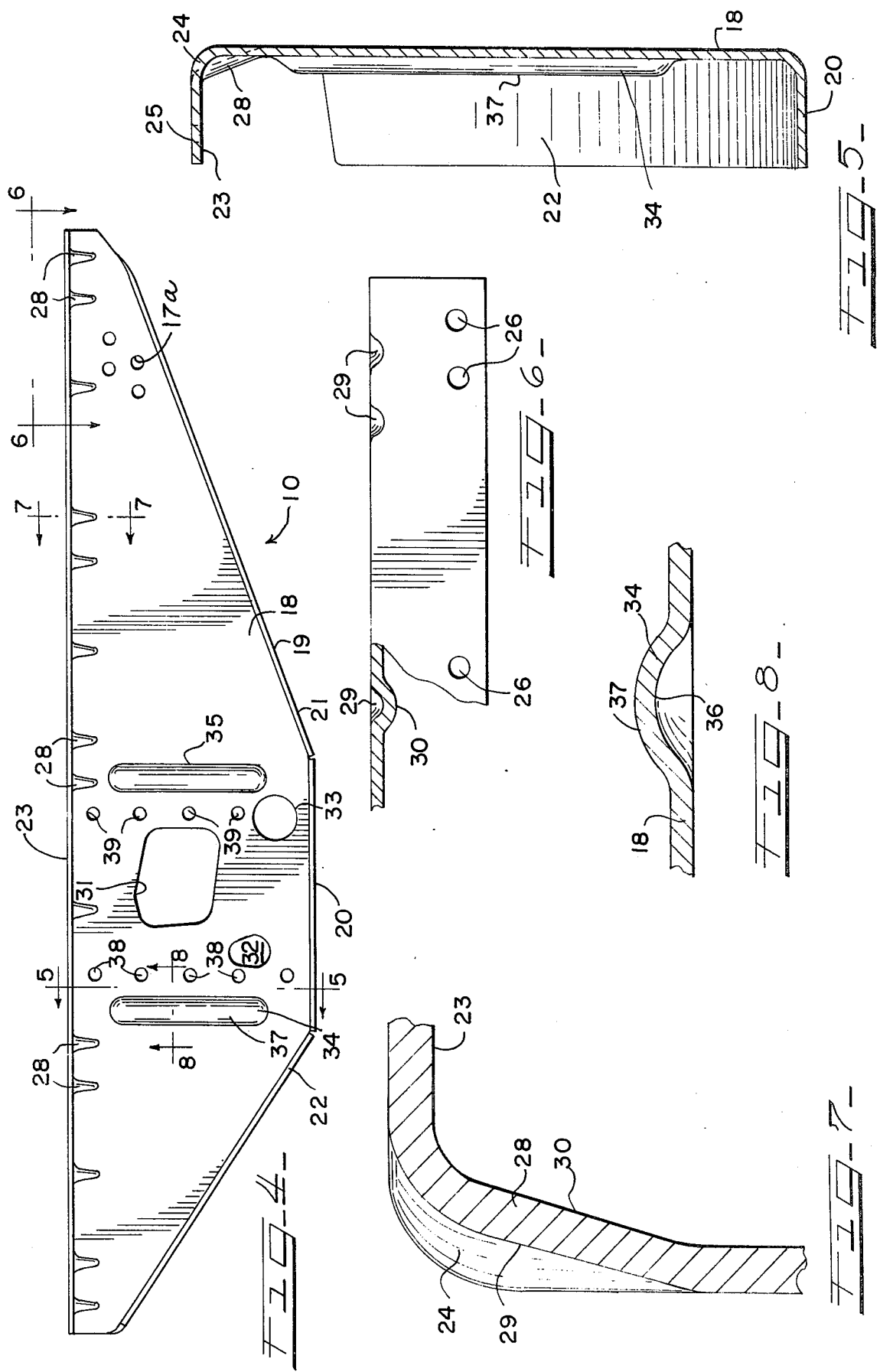

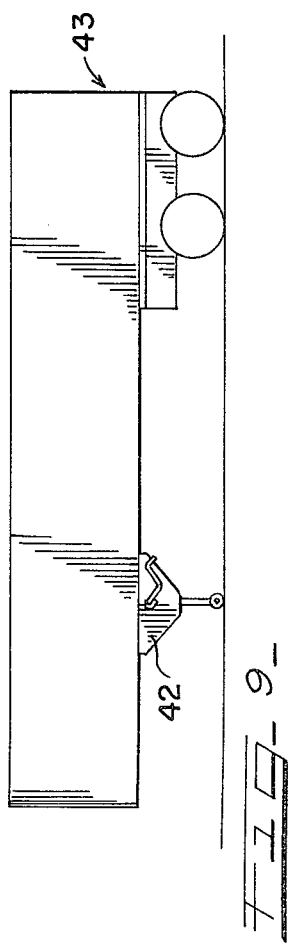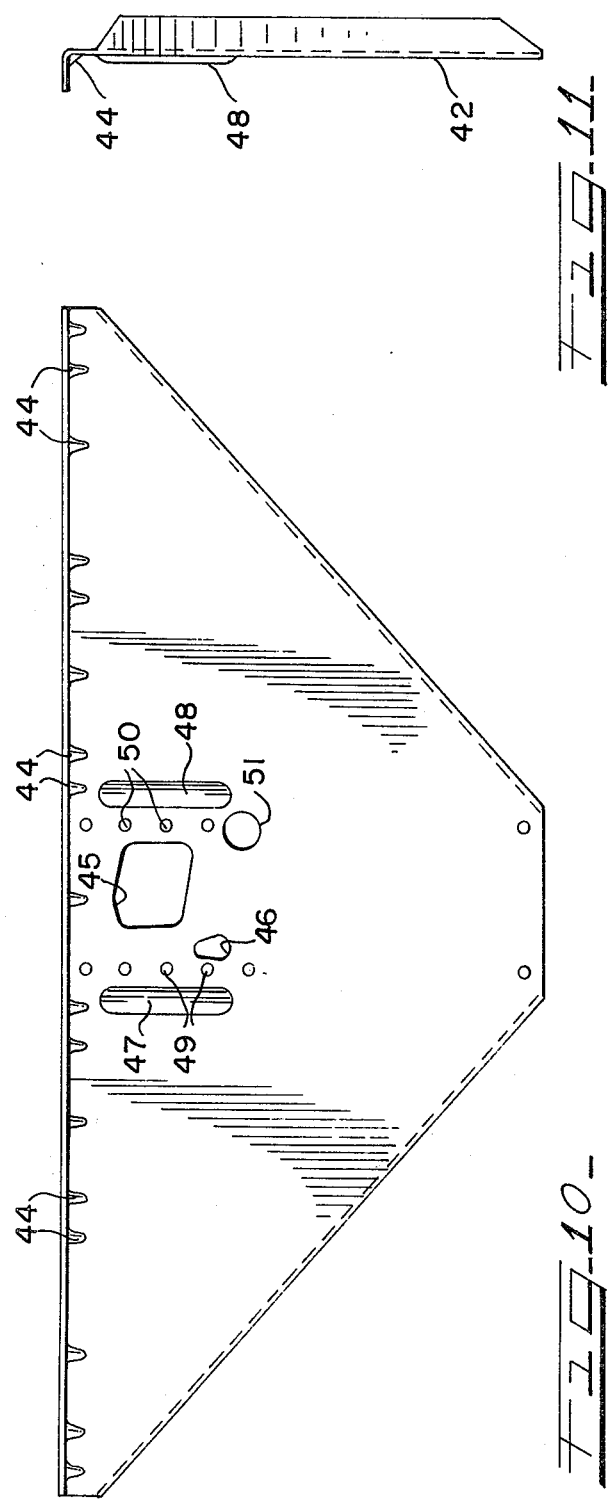

LANDING GEAR MOUNTING BRACKET

BACKGROUND OF THE INVENTION

1. Field of the Invention

This invention relates to landing gears or props on semi-trailers, and more particularly to a means of securing a landing gear leg to the trailer crossmembers.

2. Description of the Prior Art

It is known in the prior art to secure the landing gear legs of a semi-trailer to the underside of the trailer crossmembers with thin vertical mounting brackets or blades having reinforcing flanges around their perimeters. This has generally provided sufficient support for the landing gear legs. However, because severe vertical forces must be transferred through the top portion of the flange to the crossmembers, additional reinforcement of the top portion of the flange has been required to prevent material failure of the flange and consequently collapse of the landing gear.

One method of reinforcing the flange is shown in the patent to John J. Glassmeyer, U.S. Pat. No. 3,807,756 and incorporated by reference herein. More particularly, the landing gear structure of that patent includes an inverted L-shaped structural angle which is welded or bolted to the top edge of the mounting bracket and the crossmembers it supports. Another method of reinforcement has been to increase the material thickness of the mounting bracket. Although both of these methods provide reinforcement for the landing gear brackets, they substantially increase the weight, complexity of manufacture and maintenance, and consequently the cost of the semi-trailer landing gear.

The prior art landing gear structure discussed above also includes a hand crank which can be rotated to raise or lower the landing gear legs. The hand crank is secured to a crankshaft extending between the gear legs and outwardly from one side of the trailer through an aperture in the mounting bracket. However, because of the reinforcing structure necessary to insure the rigidity and load bearing capacity of the bracket, it has been necessary to minimize the diameter of the aperture in the bracket. Furthermore, since the location of the crankshaft and associated gearing mechanism with respect to the bracket varies between different makes and types of gearing mechanisms, each landing gear bracket has generally been limited to use with a particular make of gearing mechanism. Consequently, the interchangeability of various gearing mechanisms between different landing gears has been very restricted and has required substantial modification of the bracket structure.

The present invention provides a novel universal bracket structure which overcomes these difficulties.

SUMMARY OF THE INVENTION

This invention relates to reinforced universal landing gear brackets for securing the legs of a semi-trailer landing gear to the trailer crossmembers.

It is therefore an object of the present invention to provide strengthening means for a mounting bracket of a trailer landing gear.

It is another object of the present invention to provide a vertical bracket of the foregoing character having an integral flange horizontally extending from its upper end and a strengthening rib means diagonally extending between the vertical portion of the bracket and the horizontal flange to reinforce the bracket.

It is another object to provide a universal landing gear bracket of the foregoing character which will accommodate a variety of crankshaft gearing mechanisms by utilizing bead reinforcing means to allow for an enlarged crank clearance aperture.

These and other objects will become apparent from reference to the following description, attached drawings and appended claims.

BRIEF DESCRIPTION OF THE DRAWINGS

FIG. 1 is a side elevational view of a trailer;

FIG. 2 is a side elevational view of the landing gear partially in section to show the cross-members of the trailer;

FIG. 3 is a rear elevational view of the landing gear;

FIG. 4 is a side elevational view of the landing gear mounting bracket;

FIG. 5 is a cross-sectional view taken along line 5—5 of FIG. 4;

FIG. 6 is a plan view taken along line 6—6 of FIG. 4;

FIG. 7 is a cross-sectional view taken along line 7—7 of FIG. 4;

FIG. 8 is a plan view taken along line 8—8 of FIG. 4;

FIG. 9 is a side elevational view of a trailer having a landing gear provided with a deep mounting landing gear bracket;

FIG. 10 is a side elevational view of the deep mounting landing gear bracket; and FIG. 11 is an end elevational view of the deep mounting landing gear bracket shown in FIG. 10.

DESCRIPTION OF THE PREFERRED EMBODIMENT

With reference to the drawings and in particular with reference to FIG. 1, there shown is a highway semi-trailer 1 provided with a cargo body 2 supported on a chassis 3. The chassis 3 is carried on a bogie 4 at its rear end and has a landing gear arrangement or structure 5 at its forward end. A conventional kingpin 6 is provided to couple the trailer to the rear of a tractor in the usual manner.

The landing gear arrangement or structure 5 includes a pair of transversely spaced gear legs 8 which are each secured to the crossmembers or cross bearers 9 by thin vertical brackets or gussets 10 and are each provided with a wheel or sand shoe 11. Additionally, to reinforce the gear structure, the invention provides a transversely extending and upwardly diagonal reinforcing transverse member or brace 15 interconnecting the lower portion of each gear leg 8 and the crossmember 9 and a horizontal reinforcing transverse member or brace 16 rigidly interconnecting the lower portions of each gear leg 8. Similarly, to prevent longitudinal deflection or failure of the gear structure, a longitudinally extending vertically diagonal reinforcing support member or brace 17 is included to rigidly interconnect the lower portion of each gear leg 8 and the mounting bracket 10. A plurality of attachment holes 17a are provided in the bracket 10 for securing the upper end of brace 17 to the bracket with nut and bolt combination 17b.

The landing gear arrangement 5 is further provided with a crank handle 7 which may be rotated to rotate the crankshaft or cross shaft 12, which, acting through the gear box 13, provides for simultaneous vertical movement of the landing gear legs 8 as illustrated by the dotted lines in FIG. 2. Additionally, a retainer hook 14 is provided to store the crank handle 7.

As shown in FIGS. 4–7, the mounting bracket 10 provided to secure each gear leg 8 comprises a generally triangular gusset or vertical longitudinal plate 18 and a flange means 19 about the plate perimeter and perpendicularly extending from the plate 18. The flange means 19 includes a lower horizontal flange 20, diagonally diverging end edge flanges 21 and 22, and an upper horizontal flange 23. The upper flange 23 includes a connecting bent or bend portion 24 having a substantially 90° bend area and a flange attachment portion 25 which includes a plurality of holes 26 provided for fastening means 27 such as rivets or other means appropriate for securing the flange 25 to the underside of the crossmembers 13. Additionally, it should be particularly noted that the connecting or bend portion 24 is curved, bow formed, or bent to insure continuous stress distribution through its bend portion.

To rigidify and reinforce the connection between the upper flange 25 and the vertical plate 18 of the bracket 10, the bend portion 24 is provided with a plurality of diagonally extending strengthening ribs 28. Each rib 28 diagonally extends between the attachment portion 25 of the upper flange 23 and the plate portion 18 and generally intersects plate at 30°. Additionally, each rib is integrally formed in the bent portion 24 and includes an indented portion 29 defining a recess on the outside of the bent portion 24 and a complementary protuberance 30 on the other side or inside of the bent portion 24. Additionally, by providing that the ribs 28 be inwardly protruding, the reinforcing character of each rib is enhanced and the possibility of any interference between the reinforcing ribs and the trailer crossmembers is eliminated.

The invention also provides three enlarged crankshaft clearance apertures or ports 31, 32 and 33 in the plate 18 through which the crankshaft 8 may be alternatively extended when the landing gear 5 is assembled. By providing these alternative crankshaft apertures the bracket 10 may be used with a variety of crankshaft gearing mechanisms, and additionally, the crankshaft 8 extending through one of the apertures in the bracket may be engaged by the crank 7 from either side of the vehicle.

The bracket structure 10 additionally includes reinforcement means to prevent lateral bending or failure of the plate or gusset 18. More particularly, longitudinally spaced vertical reinforcing beads or ribs 34 and 35 are provided adjacent the apertures 31, 32 and 33. As illustrated in FIG. 8, the bead or rib 34 is integrally formed in the gusset 18 and defines a recess 36 on the one side or inside and a complementary protuberance 37 on the other side or outside of the gusset 18. The bead 35 is similarly formed in the gusset 18. The reinforcing beads or ribs 34 and 35 facilitate the inclusion of the enlarged crankshaft clearance apertures or ports 31, 32, and 33 in the bracket structure without significantly reducing the structural integrity of the bracket.

The preferred embodiment of the invention also includes a series of vertically aligned attachment holes 38 (FIG. 4) and a second series of attachment holes 39 (FIG. 4) longitudinally spaced from the first for securing the gear leg to the bracket 10 by means of a plurality of nut and bolt combinations 40 and 41 (FIG. 2). Both series of holes 38 and 39 are positioned in cooperative relation with the brace attachment holes 17b. By this means, the invention provides that the height of the landing gear 5 can be adjusted so that the trailer may be level though varying diameter tires are used with the bogie 4 by securing the gear leg 11 to the bracket 10 through the attachment holes 38, 39 in the upper portion or the lower portion of the bracket.

FIGS. 9–11 show the applicant's invention as embodied in a deep mounting bracket gear structure 42 provided for a semi-trailer 43 of substantially the same character as the trailer 1. As discussed above in regard to the mounting bracket 10 of the landing gear 5, the deep mounting bracket 42 includes diagonal strengthening ribs 44, crankshaft clearance apertures or ports 45, 46 and 51 and reinforcing beads or ribs 47 and 48 of substantially the same character. To provide for securing the landing gear to the bracket in a manner which facilitates leveling of the trailer when larger diameter tires are used, a series of vertically aligned gear leg attachment holes 49 and a second series of vertically aligned attachment holes 50 longitudinally spaced from the first are provided in the bracket.

The foregoing description and drawings merely explain and illustrate the invention and the invention is not limited thereto, except insofar as the appended claims are so limited, as those skilled in the art who have the disclosure before them will be able to make modifications and variations therein without departing from the scope of the invention.

What is claimed is:

1. For a semi-trailer having an underframe and a landing gear including a pair of laterally spaced vertical landing gear legs, an attachment means for securing each gear leg to the trailer underframe, comprising:

a vertical gusset including a vertical plate portion couplable with the gear leg and a generally horizontal flange extending from the top of said plate portion, said upper flange including a stress-distributing bend portion joining with the top of said plate portion and an attachment portion having means for attachment to the trailer underframe and being joined to the bend portion in a corner-defining relationship, said bend portion including a plurality of laterally and vertically extending strengthening ribs spanning the corner, said vertical plate portion including a plurality of vertically extending strengthening beads spaced lengthwise of the plate portion, means for fastening a gear leg to the plate portion between said beads, said vertical plate portion having a crank clearance aperture located between the strengthening beads and said beads being spaced sufficiently far apart so that the crank clearance aperture may be of desired configuration and size for selectively extending various types of associated gear mechanisms therethrough, said plate portion being generally trapezoidal in side elevation and having reinforcing edge means, said plate portion extending flatwise fore and aft of the underframe, and said edge means extending at acute angles to said upper flange and said vertical beads in a strut-like mutually triangular relation in the plane of the plate portion.

2. The invention according to claim 1, and said vertical plate portion having two lower crank clearance apertures located generally below and on either side of said crank clearance aperture for selectively extending various types of associated gear mechanisms therethrough.

3. The invention according to claim 2, and said rib means being an indented portion in the bend portion to define a recess on one side of the bend portion and a protuberance on the other side of the connecting rib, and said beads being an indented portion in said vertical plate to define a recess on one side of the plate and a protuberance on the other side of the plate.

* * * * *